April 19, 1966    H. F. TONEY    3,246,437
JOINT FOR INTERCONNECTING PANELS
Filed Oct. 17, 1962
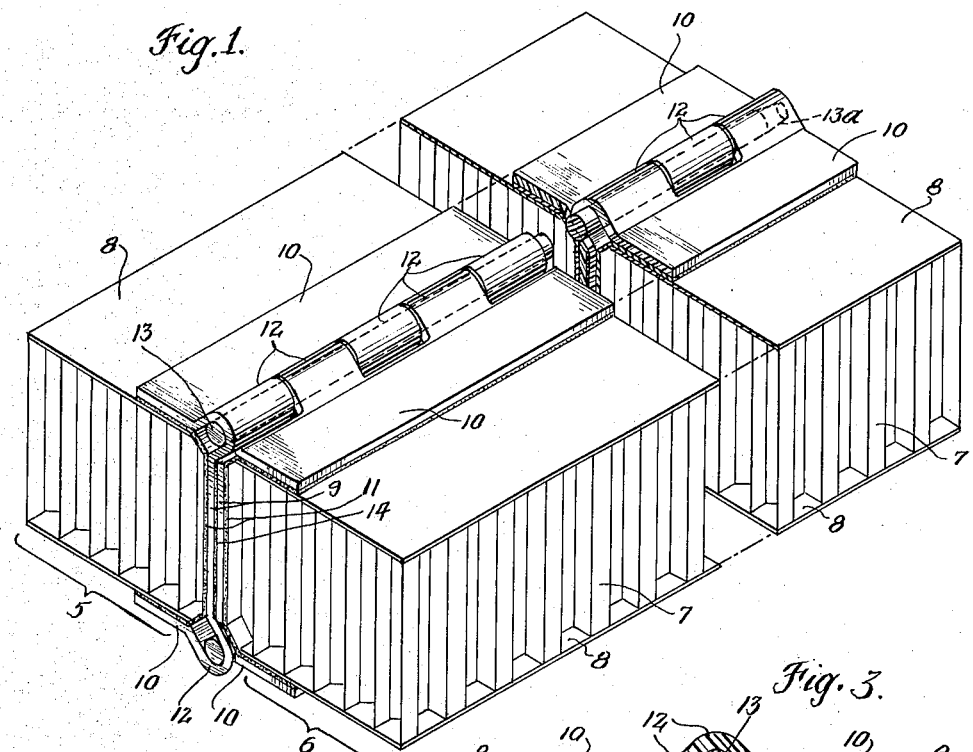
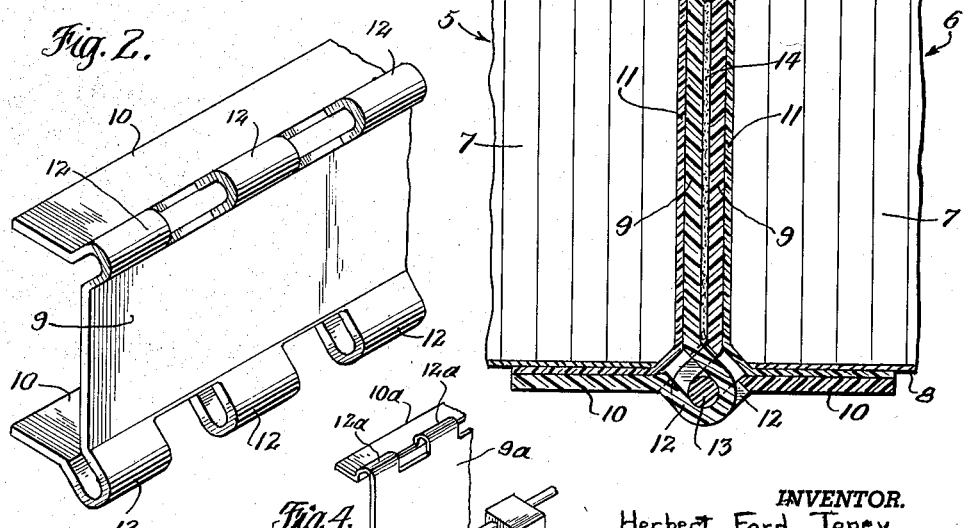
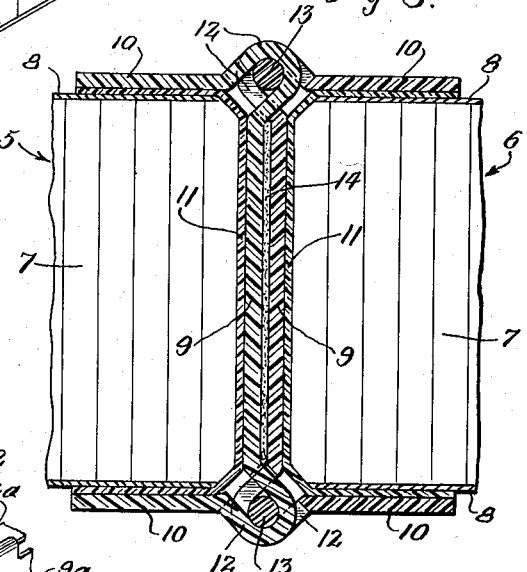
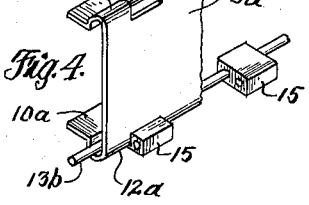
INVENTOR.
Herbert Ford Toney
BY
ATTORNEYS United States Patent Office 3,246,437
Patented Apr. 19, 1966

3,246,437
JOINT FOR INTERCONNECTING PANELS
Herbert Ford Toney, Bristol, Va., assignor to Universal Moulded Fiber Glass Corp., Bristol, Va., a corporation of Delaware
Filed Oct. 17, 1962, Ser. No. 231,084
6 Claims. (Cl. 52—309)

This invention relates to a joint structure for use in interconnecting panels in edge-to-edge relation. While certain features of the invention are applicable to the interconnection of panels of a wide variety of types employed for a wide variety of purposes, the invention is of especial advantage when used in the interconnection of panels composed of honeycomb or similar structure.

As illustrative of the type of panel to which the invention is especially adapted, reference is made to panels which are made up of paper or resin strips which are crimped and assembled in a manner providing a multiplicity of polygonal apertures or passages extended transverse the plane of the panel, in the general manner of a honeycomb, the two side faces of the panel ordinarily being covered with a sheet material, which may be made of various materials, for instance a glass fiber reinforced resin. In such a panel structure the honeycomb passages are closed by the face sheets and although the entire structure may be of exceedingly light weight, the interconnection of the face sheets with the intervening honeycomb structure provides considerable strength, at least in regions inboard of the marginal edges of such panels.

There are many purposes for which it is desired to assemble a number of such panels in edge-to-edge relation, a typical example of such a purpose being a radome structure, i.e., a housing for radar reflectors and similar equipment. For this purpose it is necessary to have a radome structure which is, so to speak, electromagnetically transparent, i.e., is composed of electrically non-conductive material, usually dielectric or insulative material, so that the radar signals will not be impeded in their progression to and from reflectors housed within the radome. At the same time, the structure of the radome should have substantial strength, especially in order to resist various forces such as high winds, which represents a substantial problem, as will readily be apparent when considering the fact that radomes of this character may frequently be as large as 40, 50 or even 60 feet in diameter.

A structure well suited to the above purposes is composed of honeycomb sandwich panels interconnected in edge-to-edge relation so as to make up the generally spherical or other desired shape of the radome or similar enclosure. The honeycomb structure of such panels is advantageously made of paper or cardboard, or of resin or plastic material, there being glass fiber reinforced plastic sheets at opposite faces of the panels. Although this general type of honeycomb sandwich panel is well known to be a desirable material for the purposes indicated, considerable problems have always been present in connection with the joining of the panels to make up the radome or other structure being formed.

Because of the honeycomb structure of the panel itself, when the panel is cut to the desired size and shape, the cut weakens the structure of the panel at and adjacent to the cut; and in addition because of the honeycomb structure itself it is difficult to fasten to the edge of the panel some structure for interconnecting the adjoining edges of the panels.

Among the objects of the present invention is the provision of a joint structure for interconnecting panels of the kind referred to, which joint structure has high resistance to various loads and forces such as tensile separation loads, compressive joint loads, bending moments which may occur at or across the joint, as well as shearing loads in all directions across the panel joint.

In addition it is a further object of the invention to provide a joint affording a reliable seal against the penetration of all forms of precipitation moisture.

Still further it is an object of the invention to facilitate and simplify the field assembly of structures made of a plurality of such interconnected panels.

In accordance with still another aspect of the invention, provision is made for the construction of electronic radomes and other similar structures presenting a minimum of conductive material to the radio frequency energy beams passing through the structure, the joint of the present invention being formed of non-conductive materials, as will further appear.

Although the invention is of especial use in connection with the joining of honeycomb type panels, it should be understood that the term honeycomb as used herein is to be understood in a broad sense, with no limitation to any particular shape of pores or passages in the panel structure. Thus the invention is also applicable to other forms of porous panels and will provide especial advantages as hereinabove indicated wherever the cutting of such panels of porous material results in a tendency to weaken the edge portions of the panel or presents a special problem from the standpoint of application of the joint structure for the interconnection of a plurality of such panels. However, since the honeycomb type of panel structure is typical of those with which the invention provides special advantages, the invention is hereinafter described in that connection.

Moreover, although the electromagnetically transparent materials are preferred in both the panels themselves and also in the joint parts for purposes such as radomes, it should also be kept in mind that for certain other purposes electromagnetic transparency is not needed and, indeed, it may even be preferred for such other purposes to employ conductive materials in the panels, for instance crimped aluminum strips for the honeycomb structure itself, and also aluminum for the face sheets at opposite sides of the panels.

How the foregoing and other objects and advantages are obtained will be apparent from the following description of the drawings, in which:

FIGURE 1 is an isometric view of adjoining edges of a pair of honeycomb panels, together with joint structure according to the present invention applied thereto for interconnecting the panels shown;

FIGURE 2 is an isometric view of a portion of one of the panel joint pieces used according to the present invention, this view being on the same scale as that of FIGURE 1;

FIGURE 3 is a transverse sectional view through a joint such as shown in FIGURE 1, this view being on an enlarged scale as compared with FIGURES 1 and 2;

FIGURE 4 is a view on a smaller scale but similar to FIGURE 2 and illustrating a modified form of panel piece and joint arrangement as will be further described.

Referring now to the embodiment of FIGURES 1 to 3 inclusive, the adjoining edges of two panels are indicated at 5 and 6, these panels each being made of a honeycomb structure 7 having face sheets 8—8. Such panels may be made up in various sizes and thicknesses, a typical thickness being of the order of one or two inches. The corners along the adjoining edges of the panels may be chamfered somewhat as indicated in FIGURES 1 and 3.

At the adjoining edge portion of each panel, the panel is provided with a channel piece shown to best advantage in FIGURE 2 and having a base 9 and a pair of flanges 10 arranged to receive the edge portion of the panels. In applying the channel piece to the edge of the panel, it is preferred to utilize an adhesive bonding means and preferably for this purpose the invention employs a strip of woven fabric, or felted or mat material, for instance glass fiber mat 11, which is impregnated with an adhesive, for instance a resin of the thermosetting type. After application of the mat over the edge of the panel, the channel is applied to the edge while the mat is still wet and the panel with the applied channel is then placed in a jig to properly position the parts and the adhesive bonding agent is permitted to dry, with or without the application of heat, depending upon the particular adhesive or bonding agent used. For many purposes an epoxy type of resin may be employed for this purpose, and such adhesive resins readily set at room temperature, as is known.

The presence of the resin soaked mat between the edge of the panel and the interior of the channel piece provides leeway for accommodation of irregularities of fit between the panel edge and the channel, and this arrangement, especially where the intervening mat extends entirely throughout the joint, i.e., between both the base of the channel 9 and the flanges of the channel 10—10 and the corresponding surfaces of the panel edge, contributes considerable strength to the edge portion of the panels, in the very region in which the cutting of the panels to size has a tendency to weaken them.

Similar channel pieces are applied to the adjoining edges of both panels to be connected and for purposes of interconnection, in the embodiment of FIGURES 1 to 3, each channel piece is provided with lugs 12 preferably along both corners, the lugs 12 being formed by cutting out intervening portions of a grooved or crimped portion of the channel piece, and the two channel pieces at the adjoining edges of the pair of channels are cut out so as to provide lugs 12 which interfit along the channel pieces, as plainly seen in FIGURE 1. In this way aligned apertures are provided for receiving the fastening pins 13. Preferably such pins have a tapered end as indicated at 13a in FIGURE 1 in order to facilitate insertion of the pin and ultimate accurate alignment of the two panels with respect to each other. When two panels are joined in this way it is preferred to position a rubber or other resilient sealing gasket or other element 14 between the adjacent faces of the pieces 9—9 of the two channel pieces (see particularly FIGURE 3). When arranged and assembled as just described, the joint provides good strength characteristics in various respects already mentioned above. The presence of the rubber gasket 14, and also the complete enclosure of the edge portions of the panels with the ply 11 of the adhesive laminate lying between the channel and the panel edge, effectively seals the joint against all penetration or ingress of any form of atmospheric moisture.

Attention is now called to the fact that the shape of the channel pieces is such that they may readily be formed by a continuous forming operation for instance a continuous operation of the kind disclosed for example in the copending application of LeRoy R. Boggs, Serial No. 115,633, filed June 8, 1961, and assigned to the assignee of the present application. In accordance with such a technique the channel piece may readily be formed of glass fiber reinforced resin material, which is of advantage because of its electrical characteristics, being non-conductive and therefore of such character as will not interfere with the radio frequency energy beams passing through a structure such as a radome. When the channel piece is made in this way, it will initially be formed with a continuous groove at the corners which may readily be cut out as above referred to to provide the spaced lugs for cooperation with a similar channel piece on an adjoining section.

The fastening pins 13 may likewise be made in a similar manner, for instance according to the method disclosed in the application of LeRoy R. Boggs above identified and may be composed of glass fiber reinforced resin material. In this way the entire structure of the joint is non-conductive and therefore, not even any portion of the joint structure provided between the panels would interfere with the penetration of radio frequency beams.

Another feature to be noted in connection with the arrangement just described is that the lugs 12 are so positioned as to provide apertures for receiving the pins 13, which apertures lie at the outer side of planes adjacent the faces of the adjoining edges of the pair of panels, thereby providing clearance for insertion of the pins 13 when the adjoining edges of the panels are brought into assembled relation.

In the alternative embodiment illustrated in FIGURE 4, a somewhat modified shape of channel piece is provided, having a base 9a and side flanges 10a and 10a. In this case the lugs 12a are somewhat differently shaped than those appearing in FIGURE 2 in that the lugs 12a do not project beyond the plane of the base or web 9a of the channel, although the lug apertures are located outside of the planes of the side faces of the panels to provide clearance for insertion of the connecting pins. When two panels are to be joined in the general manner described above, but with channel pieces formed according to FIGURE 4, apertured joining blocks 15 are positioned in the spaces between the lugs 12 of each of the two channel pieces, these blocks being provided with pairs of apertures, one of which cooperates with the pin 13b which is associated with one of the channel pieces and the other of which cooperates with another similar pin (not shown in FIGURE 4) which cooperates with the channel piece of the adjoining panel. By means of these connecting blocks and pins 15 and 13a at both sides of the joint a strong joint is provided and in addition the joint provides for accommodation of irregularities of fit between adjoining panels.

It should be understood that in the embodiment of FIGURE 4, as in the embodiment of FIGURES 1 to 3, the channel pieces are adhesively bonded to the edges of the panels and in addition, a resilient gasket of the kind illustrated at 14 in FIGURE 3 is also inserted between the adjacent faces of the two channel pieces being interconnected at the joint.

The arrangement of FIGURE 4 is of particular advantage in a situation where it is necessary or desired for assembly purposes to bring the two panel pieces together in edge-to-edge relation in a path perpendicular to the plane of the panels. For instance in the construction of a radome, although most of the panels may readily be brought together in a generally edgewise direction, the assembly of the last panels cannot be brought together in such a path, but must be inserted into an aperture remaining to be closed in the structure. The configuration of the lugs 12a in FIGURE 4 will permit assembly in that manner.

The arrangement of FIGURE 4 also has various of the other advantages hereinabove mentioned.

Although the panels shown in the drawing are flat panels, it is to be understood that the invention is applicable either to flat or to curved panels. In some instances curved panels may be provided with straight edges, in which event the joint parts may be straight. On the other hand in cases where the panels are curved along the axis of the panel joint, curved joint panels and also joint pins may be fabricated with curvature fitting that of the panels, for instance according to the method disclosed in copending application of LeRoy R. Boggs, Serial No. 188,111 filed April 17, 1962 and now abandoned, and assigned to the assignee of the present application. In some instances although curved joint panels may be used, it may not be necessary to use curved fastening pins, for the reason that such pins, particularly when made of glass fiber reinforced resin material have sufficient transverse flexibility to be readily inserted in the lug apertures even where the joint panels have substantial curvature.

The arrangement of the joint parts, particularly when a resilient gasket such as shown at 14 is inserted between the webs of the two joint panels, provides for a substantially slop-free joint. The joint provided according to the invention is also of great strength, as will now be fully apparent.

I claim:

1. A joint structure interconnecting honeycomb panels in adjacent edge-to-edge relation, each panel having an edge portion defined by spaced major exposed panel faces with terminal edge surfaces extending therebetween, said joint structure comprising, in combination with adjoining edge portions of a pair of said panels a channel shaped joint piece attached to and extending throughout the major portion of the length of each adjoining edge portion of said pair of panels, each said channel shaped joint piece having a base and laterally extending parallel legs, the legs being spaced and embracing the edge portion of the panel and having their inner faces adhesively secured to the panel, and the inner face of the base lying in a plane substantially at right angles to the planes containing the inner faces of the legs, said base also lying adjacent said terminal edge surface of the panel, the legs and the base being interconnected by corner parts, each corner part comprising a plurality of lugs spaced longitudinally along the length of said channel shaped joint piece and shaped to define aligned pin receiving apertures positioned outside of the planes of said inner faces of the legs to thereby provide clearance for insertion of pins for interconnecting the lugs of joint pieces of said adjacent panels, and interconnecting pin means received in the apertures of the lugs of the adjacent channel shaped joint pieces at at least one major exposed face of the interconnected panels.

2. A construction according to claim 1 in which the lugs of the channel pieces of the pair of panels interfit with each other with the apertures therein in alignment and said interconnecting pin means comprising a panel interconnecting pin projecting through said aligned apertures defined by the interfitting lugs of the channel pieces.

3. A construction according to claim 1 in which the lugs of the channel pieces of the pair of panels lie in side-by-side pairs at opposite sides of a transverse plane through the joint between the adjoining edges of the pair of panels, and said interconnecting pin means comprising joint blocks each having two spaced apertures and being positioned in the spaces between longitudinally adjacent lugs of each channel piece with the block apertures respectively in alignment with the apertures of the lugs at opposite sides of said plane and receiving a pair of panel interconnecting pins projecting respectively through the aligned lug apertures and block apertures on opposite sides of said plane and serving to interconnect the pair of panels through said blocks.

4. A construction according to claim 1 and further including for each channel shaped joint piece, fibrous strip material between the inner faces of the base and legs of the channel and the edge portions defined by the exposed panel faces and the terminal edge of the panels to which the channel shaped joint pieces are applied, and adhesive material permeating the fibrous strip material and bonding the channel pieces, strip material and panel together.

5. A construction according to claim 1 and further including a resilient sealing strip between the bases of the interconnected channel shaped joint pieces.

6. In a radome, an assembly of electrically non-conductive honeycomb panels in edge-to-edge relation, each pair of adjoining panels having major exposed panel faces with terminal edge surfaces extending therebetween, joint structure interconnecting adjoining edge portions of the pairs of said panels comprising a channel shaped joint piece attached to and extending throughout the major portion of the length of each adjoining edge portion of said pair of panels, each said channel shaped joint piece having a base and laterally extending parallel legs, the legs being spaced and embracing the edge portion of the panel and having their inner faces adhesively secured to the panel, and the inner face of the base lying in a plane substantially at right angles to the planes containing the inner faces of the legs, said base also lying adjacent said terminal edge surface of the panel, the legs and the base being interconnected by corner parts, each corner part comprising a plurality of lugs spaced longitudinally along the length of said channel shaped joint piece and shaped to define aligned pin receiving apertures positioned outside of the planes of said inner faces of the legs to thereby provide clearance for insertion of pins for interconnecting the lugs of joint pieces of said adjacent panels, and interconnecting pin means received in the apertures of the lugs of the adjacent channel shaped pieces at at least one major exposed face of the interconnected panels, said channel shaped joint pieces and the interconnecting pin means being formed of glass fiber reinforced resin material.

References Cited by the Examiner

UNITED STATES PATENTS

| 1,375,212 | 4/1921 | Crone | 16—163 |
| 1,654,293 | 12/1927 | Lamm | 189—75 |
| 1,988,085 | 1/1935 | Orlando | 244—131 |
| 2,321,566 | 6/1943 | Wilson | 52—582 X |
| 2,414,628 | 1/1947 | Battin | 52—227 |
| 2,521,279 | 9/1950 | Becker | 220—4 |
| 2,644,553 | 7/1953 | Cushman | 189—36 |
| 2,752,275 | 6/1956 | Raskin et al. | 52—309 |
| 2,882,588 | 2/1958 | West | 20—92 |
| 2,985,881 | 5/1961 | Holland et al. | 52—81 X |
| 3,002,717 | 10/1961 | Pavlecke | 52—582 X |
| 3,043,054 | 7/1962 | Schmidt | 52—81 |
| 3,110,064 | 11/1963 | Koontz | 52—81 X |

FRANK L. ABBOTT, *Primary Examiner.*

HENRY C. SUTHERLAND, RICHARD W. COOKE, JR., *Examiners.*